Sept. 13, 1955  P. J. OWSEN ET AL  2,717,808
ROLLER SKATE WHEEL
Filed April 25, 1950
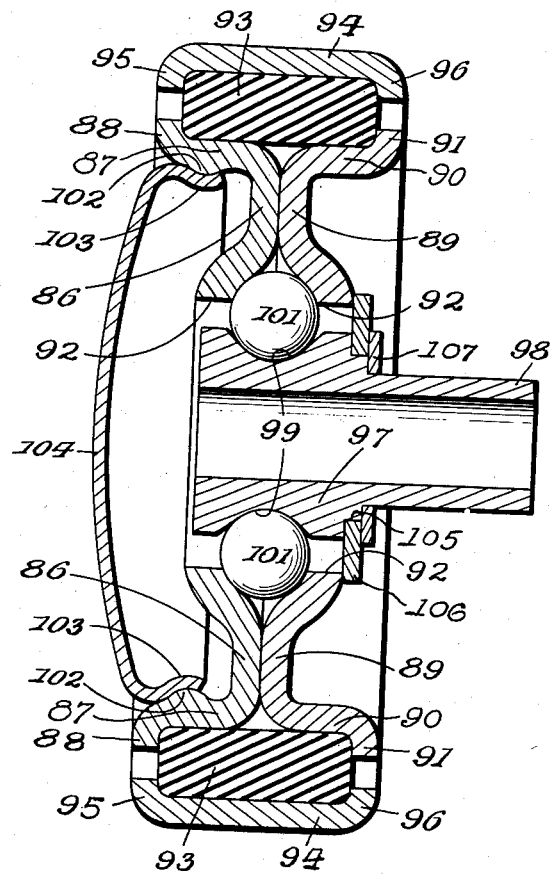
INVENTORS
Paul J. Owsen
Peter Owsen
BY Thos. S. Donnelly
ATTORNEY

United States Patent Office 2,717,808
Patented Sept. 13, 1955

2,717,808

ROLLER SKATE WHEEL

Paul J. Owsen and Peter Owsen, Dearborn, Mich.

Application April 25, 1950, Serial No. 157,928

1 Claim. (Cl. 301—5.7)

Our invention relates to a new and useful improvement in a roller skate wheel especially adapted for use for skating on hard surfaces, such as floors, pavements and the like and also adapted for skating on ice.

It is an object of the present invention to provide a skate wheel of this class having the traction members so mounted that jars and shocks received thereby are not transmitted to the skater.

Another object of the invention is the provision of a skate wheel of this class of traction members which may be economically manufactured and which is so constructed and arranged that it may be easily adapted for skating on hard surfaces or on ice.

Another object of the invention is the provision of a skate wheel of this class which may be economically manufactured, which may be durable, light and highly efficient in use.

Other objects will appear hereinafter.

It is recognized that various modifications and changes may be made in the detail of structure illustrated and it is intended that the present disclosure shall be considered but the preferred embodiment.

In the accompanying drawing, the figure is a central cross-sectional view of a skate wheel constructed in accordance with the present invention.

The roller skate wheels are formed from a pair of discs which are substantially duplicates of each other. As shown on the drawing the disc 86 is provided with the rim portion 87 having the outwardly turned flange 88. The complementary disc 89 is also provided with an outwardly directed rim portion 90 having the outwardly turned flange 91, and through each of these discs there is provided a central opening 92 and each of the discs at the central opening is flared outwardly as shown on the drawing and arcuately curved on their inner sides to form a ball race. These discs are secured together in fixed relation as by welding their contacting surfaces or any other suitable manner so that the parts 87 and 90 are in alignment and the openings 92 are in alignment. Mounted on the rim portions 87 and 90 of the wheel is a ring 93 formed from rubber or other suitable flexible shock-absorbing material and embracing this ring 93 is the tread portion 94 of the wheel which may be formed from metal, fibre or other suitable material. An inwardly projecting flange 95 is formed at one side of the member 94 and a similar inwardly projecting flange 96 is formed at the other side, and the ring 93 engages between these flanges so that the tread portion of the wheel is held on to the rim by the ring 93 of yieldable shock absorbing and sound-deadening material. It will be observed that the opposed flanges 88—95 and 91—96 are relatively closely spaced for the better confinement of the elastic ring 93 and to add stability to the wheel, the arrangement being such that sufficient cushioning properties are present with a tendency of the tread portion 94 shifting laterally of the rim portions 88—90 practically eliminated. The wheel includes the hub 97 which is carried by the tube 98. In the periphery of the hub 97 is formed a groove 99 in which are positioned roller bearings 101 adapted for engaging in the ball race of the discs 86 and 89 so that the wheel is rotatably mounted on the hub 97. Formed on the inner side of the rim portion 87, is an inwardly extending bead 102 over which is snapped the inwardly projecting flange 103 of the hub guard 104, this flange 103 having a groove formed on its outer face for receiving the bead 102. This hub 97 is provided with a shoulder 105 on which is positioned a sealing washer 106 formed from felt or the like. Positioned on the tube 98 is a rigid washer 107 formed from metal, fibre or the like. This washer 107 serves to retain the washer 106 in sealing position.

While there is herein shown and described the preferred embodiment of the invention, it is nevertheless to be understood that minor changes may be made therein without departing from the spirit and scope of the invention as claimed.

What we claim is:

In a roller skate of the class described, a traction wheel embodying a pair of circular discs secured together in face to face relation concentrically with each other, each of said discs having a central opening formed therethrough and flared outwardly from each other around said opening to provide around said opening a space between opposed faces of said discs; an axially turned portion on each of said discs adjacent the marginal portion thereof and turned outwardly from each other and then bent to extend radially to provide an outwardly opening channel; a ring of yieldable material embracing said channel and positioned therein and extending outwardly beyond the edges of said radially bent portions; an annular tread member channel-shaped in cross section and embracing said ring, the side flanges of said tread member being directed towards said radially bent portions and extending into closely spaced relation thereto; a hub positioned in the opening in said disc having a groove formed in its periphery; ball bearings engaging in said groove and in said space for mounting said wheel structure on said hub; and a tube projecting outwardly from the inner side of said hub centrally thereof and of less outside diameter than the outside diameter of said hub and there being a passage formed through said tube and said hub for reception of an axle.

References Cited in the file of this patent

UNITED STATES PATENTS

| | | |
|---|---|---|
| 343,664 | King | June 15, 1886 |
| 440,529 | Bateman | Nov. 11, 1890 |
| 1,489,197 | Daverkosen | Apr. 1, 1924 |
| 1,566,609 | Larsen | Dec. 22, 1925 |
| 1,618,496 | Ware II | Feb. 22, 1927 |
| 1,711,451 | Gibson | Apr. 30, 1929 |
| 1,743,757 | Chestnutt | Jan. 14, 1930 |
| 1,790,293 | Ware | Jan. 27, 1931 |
| 2,074,341 | Piron | Mar. 23, 1937 |
| 2,126,359 | Vogt | Aug. 9, 1938 |
| 2,137,987 | Smith | Nov. 22, 1938 |
| 2,251,142 | Lindsay | July 29, 1941 |
| 2,316,498 | Biczak, Jr. | Apr. 13, 1943 |
| 2,457,424 | Wolf et al. | Dec. 28, 1948 |

FOREIGN PATENTS

| | | |
|---|---|---|
| 735,243 | France | Nov. 4, 1932 |